United States Patent
Watanabe et al.

(10) Patent No.: US 8,846,563 B2
(45) Date of Patent: Sep. 30, 2014

(54) APATITE AND METHOD FOR PRODUCING THE SAME, AND APATITE BASE MATERIAL

(75) Inventors: Toshiya Watanabe, Fujisawa (JP);
Masato Wakamura, Kawasaki (JP);
Yasuo Naganuma, Kawasaki (JP)

(73) Assignees: Fujitsu Limited, Kawasaki (JP); The University of Tokyo, Tokyo (JP)

( * ) Notice: Subject to any disclaimer, the term of this patent is extended or adjusted under 35 U.S.C. 154(b) by 234 days.

(21) Appl. No.: 13/067,816

(22) Filed: Jun. 28, 2011

(65) Prior Publication Data
US 2011/0263414 A1    Oct. 27, 2011

Related U.S. Application Data

(60) Division of application No. 11/594,829, filed on Nov. 9, 2006, now abandoned, which is a continuation of application No. PCT/JP2004/006462, filed on May 13, 2004.

(51) Int. Cl.
| | | |
|---|---|---|
| B01J 27/00 | (2006.01) | |
| B01J 27/188 | (2006.01) | |
| B01J 27/185 | (2006.01) | |
| C01B 15/16 | (2006.01) | |
| C01B 25/26 | (2006.01) | |
| C01B 25/32 | (2006.01) | |
| B01J 35/00 | (2006.01) | |
| B01J 27/18 | (2006.01) | |

(52) U.S. Cl.
CPC ............... *C01B 25/32* (2013.01); *B01J 27/188* (2013.01); *B01J 35/004* (2013.01); *B01J 27/18* (2013.01)

USPC ............ 502/208; 502/210; 502/213; 423/308

(58) Field of Classification Search
CPC ......... A61L 27/12; A61L 27/32; C01B 25/32; C01B 25/45; C04B 14/366; B01J 27/18; B01J 35/004; B01J 27/188
USPC ............................ 502/208, 210, 213; 423/308
See application file for complete search history.

(56) References Cited

U.S. PATENT DOCUMENTS

| | | | |
|---|---|---|---|
| 5,009,898 | A | 4/1991 | Sakuma et al. |
| 2003/0219624 | A1 | 11/2003 | Aso et al. |
| 2005/0064075 | A1 | 3/2005 | Wakamura |

FOREIGN PATENT DOCUMENTS

| | | | |
|---|---|---|---|
| DE | 3932469 | 4/1990 | |
| DE | 3932469 | 4/1991 | |
| GB | 1260539 A | * 1/1972 | ............... B01J 11/62 |

(Continued)

OTHER PUBLICATIONS

Masato Wakamura et al., "Surface composition of calcium hydroxyapatite modified with metal ions", Colloids and Surfaces A: Physiochemical and Engineering Aspects 142 (1998); pp. 107-116.

(Continued)

*Primary Examiner* — Shuangyi Abu Ali
(74) *Attorney, Agent, or Firm* — Staas & Halsey LLP

(57) ABSTRACT

The present invention relates to apatite that includes metal atoms having a photocatalytic function and other metal atoms, and the metal atoms having a photocatalytic function include metal atoms that absorb energy corresponding to light energy of visible light. By applying the apatite as a base material of various products to be arranged indoors, the photocatalytic function can be exhibited indoors as well.

2 Claims, 3 Drawing Sheets

(56) References Cited

FOREIGN PATENT DOCUMENTS

| JP | 6-001708 | 1/1994 |
| JP | 6-172113 | 6/1994 |
| JP | 08-245208 | 9/1996 |
| JP | 08245208 | 9/1996 |
| JP | 2001-302220 | 10/2001 |
| JP | 2003-80078 | 3/2003 |
| JP | 2003-175338 | 6/2003 |
| JP | 2003-321313 | 11/2003 |
| JP | 2003-334883 | 11/2003 |
| KR | 2003-0035635 | 5/2003 |
| KR | 2003-0097322 | 12/2003 |
| WO | 03007719 | 1/2003 |
| WO | 2003/079824 | 10/2003 |
| WO | 03079824 | 10/2003 |

OTHER PUBLICATIONS

Masato Wakamura et al., "Photocatalysis by Calcium Hydroxyapatite Modified with Ti(IV): Albumin Decomposition and Bactericidal Effect"; 2003 American Chemical Society, Published on Web Mar. 13, 2003; pp. 3428-3431.

Chinese Office Action for corresponding Chinese Application 200910002062.5; mailed Mar. 11, 2010.

Korean Office Action for corresponding Korean Application 10-2010-7002484; mailed Mar. 3, 2010.

Korean Office Action for Korean Application 10-2009-7006316; dated Aug. 3, 2009.

Japanese Published Application JP 3-90007, Published Apr. 16, 1991. Abstract Only.

Japanese Published Application JP 10-273322, Published Oct. 13, 1998. Abstract Only.

Japanese Published Application JP 4-13605, Published Jan. 17, 1992. Abstract Only.

Japanese Published Application JP 4-317404, Published Nov. 9, 1992. Abstract Only.

Japanese Published Application JP 2000-327315, Published Nov. 28, 2000. Abstract Only.

International Search Report (dated Aug. 24, 2004) of the International Application PCT/JP2004/006462.

English language abstract of "Formation of Calcium Chromate Hydroxylapatite on the Surface of a Calcium-Doped Lanthanum Chromite Sintered Body", Yasuda I. et al., Journal of Materials Science, vol. 29, No. 10, pp. 2801-2805, May 15, 1994.

English language abstract of "Reaction characteristics of dental and synthetic apatites with iron(II) and iron (III) ions", Yoshiaki Tanizawa et al., Journal of Chemical Society, pp. 1071-1075, 1990.

Jin Hyuk Jun et al., "Nickel-calcium phosphate/hydroxypatite catalysts for partial oxidation of methane to syngas: characterization and activation", Journal of Catalysis, pp. 178-190, 2004.

Chinese Patent Office Action, mailed Jun. 26, 2008 and issued in corresponding Chinese Patent Application No. 2004800430199.

German Office Action issued Dec. 4, 2008 in corresponding German Patent Application 112004002861.2.

Machine translation of Japanese Application 2000-327315; abstract previously filed in Nov. 9, 2006 IDS.

R. Hornung et al., Preparation and characterization of ivory-coloured hydroxyapatite, Journal of Materials Science Letters, (1992), vol. 11, No. 13, pp. 958-959.

Japanese Office Action for corresponding Japanese Application 2006-513471; mailed Jun. 9, 2009.

U. S. Office Communication from parent U.S. Appl. No. 11/594,829 enclosing translation of Japanese Reference 2001-302220; mailed Nov. 20, 2009.

U.S. Office Action for parent U.S. Appl. No. 11/594,829; mailed Jul. 20, 2007.

U.S. Office Action for parent U.S. Appl. No. 11/594,829; mailed Oct. 29, 2007.

U.S. Office Action for parent U.S. Appl. No. 11/594,829; mailed Jul. 21, 2008.

U.S. Office Action for parent U.S. Appl. No. 11/594,829; mailed Jan. 16, 2009.

U.S. Office Action for parent U.S. Appl. No. 11/594,829; mailed Nov. 23, 2009.

Decision on Appeal for parent U.S. Appl. No. 11/594,829; mailed Apr. 29, 2011.

Record of Oral Hearing for parent U.S. Appl. No. 11/594,829; mailed Jun. 9, 2011.

German Office Action (Official Minutes of the Oral Hearing) mailed Oct. 11, 2013 in German Application No. 112004002861.2 (attached English Language Oct. 17, 2013 letter planning Oct. 8, 2013 Oral Hearing in Germany.

German Office Action mailed Apr. 10, 2013 in German Application No. 112004002861.2.

* cited by examiner

US 8,846,563 B2

APATITE AND METHOD FOR PRODUCING THE SAME, AND APATITE BASE MATERIAL

CROSS-REFERENCE TO RELATED APPLICATIONS

This application is a divisional of U.S. application Ser. No. 11/594,829, filed Nov. 9, 2006 now abandoned which is a continuation application, filed under 35 U.S.C. §111 (a), of International Application PCT/JP2004/006462, filed May 13, 2004, the disclosures of all of which are incorporated herein by reference.

BACKGROUND

1. Field

The present invention relates to apatite and a method for producing the same, and an apatite base material.

2. Description of the Related Art

It has been known that a semiconductor material such as titanium oxide has a photocatalytic function. Namely, when a semiconductor material such as titanium oxide absorbs light energy of a wavelength corresponding to a bandgap between a valence band and a conduction band, electrons in the valence band move to the conduction band by excitation, and positive electric charge (positive hole) is generated in the valence band. In a case where a foreign substance (such as organics) is adsorbed on the surface of the semiconductor material, electrons moving to the conduction band move to the organics on the surface of the semiconductor material and reduce the organics. In the valence band, the positive hole generated there seizes the electrons and oxidizes the organics. Particularly, since the positive hole in the titanium oxide has an extremely strong oxidizing power, it will decompose the organics into water and carbon dioxide ultimately. In recent years, the photocatalytic function (oxidation-decomposition function) of the titanium oxide has been used. Specifically, titanium oxide has been used for an antibacterial agent, a disinfectant, a deodorant, an environmental clean-up antipollution agent, and the like. However, since the titanium oxide itself has no capability of adsorbing organics onto the surface, available oxidation-decomposition function is limited.

Calcium hydroxyapatite $Ca_{10}(PO_4)_6(OH)_2$ as a main component of biological hard tissues such as teeth and bones will exchange ions easily with various cations and anions, and thus it has high bio-compatibility and absorptivity. Therefore, applications of the apatite to medical materials such as artificial bones and artificial dental roots, and to various fields such as chromatography adsorbents, chemical sensors, ion exchangers and catalysts, have been studied keenly. The apatite has a particularly remarkable capability in adsorbing organics such as protein.

In recent studies and development, a semiconductor material such as the above-mentioned titanium oxide and a compound based on calcium phosphate such as calcium hydroxyapatite are combined to obtain the features of both materials effectively (see for example, JP 2003-80078 A and JP 2003-321313 A).

Furthermore, calcium titanium hydroxyapatite $Ca_9Ti(PO_4)_6(OH)_2$ has been developed as well (see for example, JP 2000-327315 A, JP 2001-302220 A, JP 2003-175338 A and JP 2003-334883 A). This material is provided with a photocatalytic function by exchanging a part of calcium ions in the apatite with titanium ions. Thereby, this material has a photocatalytic function substantially equal to that of titanium oxide, and the efficiency of the photocatalytic function can be improved further due to the specific absorptivity of the apatite.

However, light energy required for exciting the photocatalyst having a strong oxidizing power (such as titanium oxide) is 3.2 eV, which corresponds to a light wavelength of about 380 nm. Therefore, titanium oxide can be excited with near-ultraviolet light but cannot be excited with visible light. Since the content of the UV light in sunlight is 4-5%, the photocatalytic function of the titanium oxide cannot be sufficient. In particular, the photocatalytic function cannot be exhibited indoors under fluorescent light including substantially no UV light.

Development of photocatalyst that can act even under visible light representing about 45% of sunlight has been desired strongly. Such a photocatalyst that acts under visible light will improve the efficiency remarkably and it can exhibit the photocatalytic function even indoors under fluorescent light.

SUMMARY

The present invention relates to apatite containing metal atoms having a photocatalytic function and other metal atoms. The apatite is characterized in that the metal atoms having a photocatalytic function comprise metal atoms that absorb light energy of visible light.

The present invention relates to also a method for producing apatite, and the method includes a step of preparing a solution containing metal atoms that absorb visible light at a concentration of not less than $1\times10^{-6}$ mol/dm$^3$ and not more than $1\times10^{-2}$ mol/dm$^3$, and a step of dipping apatite in the solution.

The present invention relates to also a method for producing apatite, and the method includes a step of preparing an apatite material solution containing metal atoms that absorb visible light and other metal atoms, where the content of the metal atoms that absorb visible light is not less than 0.5 mol % and not more than 3 mol % with respect to the whole metal atoms contained in the solution, and a step of coprecipitating components contained in the apatite material solution so as to deposit apatite.

The present invention relates to also an apatite base material comprising apatite containing metal atoms that absorb visible light and other metal atoms. The apatite base material is characterized in that the metal atoms that absorb visible light are atoms of at least one kind of metal selected from the group consisting of Cr, Co, Cu, Fe and Ni, and the other metal atoms are atoms of at least one kind of metal selected from the group consisting of Ca, Al, La, Mg, Sr, Ba, Pb, Cd, Eu, Y, Ce, Na and K.

DETAILED DESCRIPTION

Embodiment of Apatite

Figure 1:
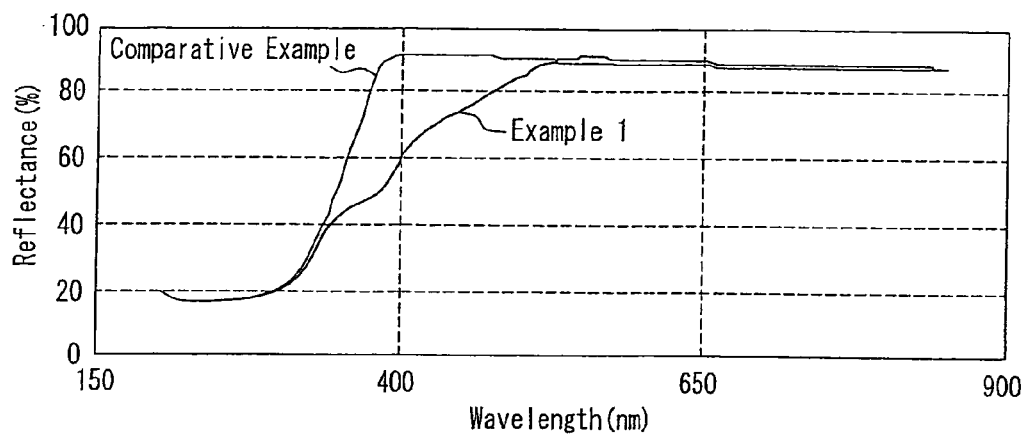
FIG. 1 is a graph showing UV-visible reflection spectra for Example 1 and Comparative Example.

An example of apatite of the present invention contains metal atoms A, metal atoms B and metal atoms C. The metal atoms A denote metal atoms contained in a normal apatite, the metal atoms B denote metal atoms that absorb UV light, and the metal atoms C denote metal atoms that absorb visible light.

In this manner, it is possible to provide apatite that can exhibit a photocatalytic function under not only UV light but also visible light, by adding to the apatite not only metal atoms that absorb UV light but metal atoms that absorb visible light.

The apatite in this embodiment can be expressed generally with a Formula (1) below.

$$A_{x-m-n}B_mC_n(DO_y)_zE_s \qquad \text{Formula (1)}$$

The metal atoms A are atoms of at least one kind of metal selected from the group consisting of Ca, Al, La, Mg, Sr, Ba, Pb, Cd, Eu, Y, Ce, Na and K, and it is a main component contained in apatite. Among the metals, Ca is used most generally.

The metal atoms B that absorb UV light are atoms of at least one kind of metal selected from the group consisting of Ti, Zr and W. Among them, Ti is most preferred. It is preferable that the content of the metal atoms B with respect to the whole metal atoms contained in the apatite is not less than 3 mol % and not more than 11 mol %, and more preferably, not less than 8 mol % and not more than 10 mol %.

The metal atoms C that absorb visible light are atoms of at least one kind of metal selected from the group consisting of Cr, Co, Cu, Fe and Ni. Among them, Cr is most preferred. It is preferable that the content of the metal atoms C with respect to the whole metal atoms contained in the apatite is not less than 0.5 mol % and not more than 2 mol %, and more preferably, not less than 0.5 mol % and not more than 1.5 mol %.

It is preferable for the apatite in this embodiment that the metal atoms A form an apatite crystal structure, and the metal atoms A are substituted partially by the metal atoms B and the metal atoms C.

"D" in the above formula denotes atoms such as P and S, and "O" denotes an oxygen atom. "E" denotes a hydroxyl group (—OH), a halogen atom (F, Cl, Br, I) or the like.

Apatite expressed by the above formula is provided, for example, by substituting metal atoms contained in hydroxyapatite, fluoroapatite, chloroapatite, tricalcium phosphate, calcium hydrogenphosphate or the like with metal atoms that absorb UV light and metal atoms that absorb visible light. Preferably apatite used in this embodiment is calcium titanium chromium hydroxyapatite where the metal atom A denotes Ca, the metal atom B denotes Ti, the metal atom C denotes Cr, D denotes P and E denotes a hydroxyl group. Apatite expressed by a Formula (2) below is preferred particularly.

$$Ca_9Ti_{0.9}Cr_{0.1}(PO_4)_6(OH)_2 \qquad \text{Formula (2)}$$

It is also preferable that the apatite in this embodiment is fired at a temperature not lower than 500° C. and not higher than 700° C. Thereby, the crystallinity of the apatite can be improved and the photocatalytic effect under the visible light can be improved further.

The apatite in this embodiment can be provided in various shapes and dimensions in accordance with the use, processing conditions or the like. Examples of the preferred shapes include a powder, a tablet, a rod, a plate, a block, a sheet, a film, and a membrane.

Another example of apatite of the present invention contains metal atoms that absorb visible light and other metal atoms. The metal atoms that absorb visible light are atoms of at least one kind of metal selected from the group consisting of Cr, Co, Cu, Fe and Ni, and the other metal atoms are atoms of at least one kind of metal selected from the group consisting of Ca, Al, La, Mg, Sr, Ba, Pb, Cd, Eu, Y, Ce, Na and K. Thereby, apatite exhibiting a visible photocatalytic function can be provided. This embodiment excludes metal atoms having a UV photocatalytic function.

It is further preferable that the apatite in this embodiment is expressed by a Formula (3) below.

$$Ca_{9.9}Cr_{0.1}(PO_4)_6(OH)_2 \qquad \text{Formula (3)}$$

Except for this matter, the apatite in this embodiment is substantially same as the apatite expressed by the Formula (1).

<Embodiment for a Method of Producing Apatite>

An example of a method for producing apatite of the present invention is a method including a step of preparing a solution that contains metal atoms that absorb visible light at a concentration of not less than $1\times10^{-6}$ mol/dm$^3$ and not more than $1\times10^{-2}$ mol/dm$^3$, and a step of dipping apatite in the solution. Namely, it is a producing method based on a so-called dipping process. Thereby, apatite that can exhibit a photocatalytic function even under visible light can be produced easily.

The metal atoms that absorb visible light are atoms of at least one kind of metal selected from the group consisting of Cr, Co, Cu, Fe and Ni.

It is preferable that the concentration of the metal atoms that absorb visible light in the solution is not less than $1\times10^{-5}$ mol/dm$^3$ and not more than $1\times10^{-3}$ mol/dm$^3$, and more preferably, not less than $4\times10^{-5}$ mol/dm$^3$ and not more than $2\times10^{-4}$ mol/dm$^3$. The visible photocatalytic function can be improved further when the concentration is in the above-mentioned range.

It is preferable that the producing method in this embodiment includes further steps of drying the apatite dipped in the solution and then firing at a temperature not lower than 500° C. and not higher than 700° C. By firing the photoresponsive apatite at a temperature not lower than 500° C. and not higher than 700° C., the crystallinity of the apatite can be improved and the visible photocatalytic function can be improved further. It is more preferable that the firing temperature is not lower than 550° C. and not higher than 650° C.

For the apatite, the above-mentioned hydroxyapatite, fluoroapatite, chloroapatite, tricalcium phosphate, calcium hydrogenphosphate or the like can be used. Typically, the apatite contains metal atoms of at least one kind of metal selected from the group consisting of Ca, Al, La, Mg, Sr, Ba, Pb, Cd, Eu, Y, Ce, Na and K. Among them, calcium hydroxyapatite $Ca_{10}(PO_4)_6(OH)_2$ is preferred particularly.

It is also preferable that the apatite contains further metal atoms of at least one kind of metal selected from the group consisting of Ti, Zr and W as metal atoms that absorb UV light. Thereby, apatite that can exhibit a photocatalytic function under not only visible light but UV light can be produced easily. For the apatite, calcium titanium hydroxyapatite $Ca_9Ti(PO_4)_6(OH)_2$ is preferred particularly.

Another example of a method for producing apatite of the present invention includes a step of preparing an apatite material solution containing metal atoms that absorb visible light and other metal atoms, where the content of the metal atoms that absorb visible light is not less than 0.5 mol % and not more than 3 mol % with respect to the whole metal atoms contained in the solution, and a step of coprecipitating components contained in the apatite material solution so as to deposit apatite. Namely, the method is based on a so-called coprecipitation process. Thereby, apatite that can exhibit a photocatalytic function even under visible light can be produced easily.

The metal atoms that absorb visible light are of at least one kind of metal selected from the group consisting of Cr, Co, Cu, Fe and Ni.

It is preferable that the content of the metal atoms that absorb visible light in the solution is not less than 0.5 mol % and not more than 2 mol % with respect to the whole metal atoms contained in the solution, and more preferably, not less than 0.5 mol % and not more than 1.5 mol %. When the concentration is in this range, the visible photocatalytic function can be improved further.

The other metal atoms are atoms of at least one kind of metal selected from the group consisting of Ca, Al, La, Mg, Sr, Ba, Pb, Cd, Eu, Y, Ce, Na and K. Among them, Ca is preferred particularly.

It is also preferable that the apatite contains further metal atoms of at least one kind of metal selected from the group consisting of Ti, Zr and W as metal atoms that absorb UV light. Thereby, apatite that can exhibit a photocatalytic function under not only visible light but UV light can be produced easily. Among them, Ti is preferred particularly.

The content of the metal atoms that absorb UV light in the solution is preferably not less than 3 mol % and not more than 11 mol % with respect to the whole metal atoms contained in the solution, and more preferably, not less than 8 mol % and not more than 10 mol %.

It is preferable that the producing method in this embodiment includes further steps of drying the apatite dipped in the solution and then firing at a temperature not lower than 500° C. and not higher than 700° C. By firing the photoresponsive apatite at a temperature not lower than 500° C. and not higher than 700° C., the crystallinity of the apatite can be improved and the visible photocatalytic function can be improved further. It is more preferable that the firing temperature is not lower than 550° C. and not higher than 650° C.

For the apatite produced by a coprecipitation process in this embodiment, calcium titanium chromium hydroxyapatite $Ca_9Ti_{0.9}Cr_{0.1}(PO_4)_6(OH)_2$ is preferred.

<Embodiment for Apatite Base Material>

An example of an apatite base material according to the present invention is a base material of apatite containing metal atoms that absorb visible light and other metal atoms. The metal atoms that absorb UV light are atoms of at least one metal selected from the group consisting of Cr, Co, Cu, Fe and Ni, and the other metal atoms are atoms of at least one kind of metal selected from the group consisting of Ca, Al, La, Mg, Sr, Ba, Pb, Cd, Eu, Y, Ce, Na and K.

It is also preferable that the other metal atoms include at least one kind of metal selected from the group consisting of Ti, Zr and W.

The base material can be selected from the group consisting of paper, synthetic paper, woven fabric, nonwoven fabric, leather, lumber, glass, metal, ceramics, plastics, and printing ink. The shape of the base material can be a foil, a film, a sheet and a plate, for example.

The apatite can be used in a state being applied/coated on at least one surface of the base material. Alternatively, the apatite can be contained in the base material. When the printing ink is used for the base material, the apatite can be contained in the ink.

Thereby, the apatite can be used for a base material of various products to be arranged indoors, and thus the apatite can exhibit the photocatalytic function even indoors where substantially no UV light exists. For example, when indoor wallpaper, clothes, and filters for air cleaners are produced by using the apatite base material in this embodiment, various bacteria, dust, bad smell, smoke of cigarettes indoors can be removed, and indoor environmental clean-up can be realized easily. In addition, by forming peripheral equipment of computers, such as keyboards, mice, and cases with the apatite base material of this embodiment, adhesion of stains such as fingerprints can be prevented. Furthermore, the apatite base material in this embodiment can be used for sanitary goods such as masks, bandages, and antimicrobial gloves.

For the apatite used in the apatite base material in this embodiment, any of the apatite mentioned in the embodiment can be used. It is preferable that the apatite is fired at a temperature not lower than 500° C. and not higher than 700° C.

The present invention will be described below by referring to Examples. The description below for respective Examples refers to apatite generally containing the metal atoms A, B and C that are determined as Ca, Ti and Cr respectively in the Formula (1). However, similar effects can be obtained by using apatite containing a combination of any other metal atoms applicable in the present invention.

<Production of Apatite by a Dipping Process>

Example 1

Apatite was produced by a dipping process in the following manner. A commercially available calcium titanium hydroxyapatite $Ca_9Ti(PO_4)_6(OH)_2$ (trade name: "TiHAP0201" supplied by Taihei Chemical Industrial Co., Ltd.; hereinafter, referred to as TiHAP) of 1.5 g was added to 300 cm³ of an aqueous solution of chromium nitrate of $1 \times 10^{-4}$ mol/dm³, which was then stirred with a magnetic stirrer for 5 minutes. After stirring and filtering, the thus obtained product was washed in pure water of 4 dm³, dried in an oven at 100° C. so as to obtain a Cr-doped TiHAP powder. Subsequently, this TiHAP powder was heated to 650° C. in one hour to be fired, and thus a sample for Example 1 was obtained.

Example 2-7

Samples for Examples 2-7 were produced in the same manner as in Example 1 except that aqueous solutions of chromium nitrate of concentrations as shown in Table 1 were used.

TABLE 1

| | Concentration (mol/dm³) |
|---|---|
| Example 2 | $1 \times 10^{-6}$ |
| Example 3 | $1 \times 10^{-5}$ |
| Example 4 | $4 \times 10^{-5}$ |
| Example 5 | $2 \times 10^{-4}$ |

TABLE 1-continued

| | Concentration (mol/dm³) |
|---|---|
| Example 6 | $1 \times 10^{-3}$ |
| Example 7 | $1 \times 10^{-2}$ |

<Production of Apatite by a Coprecipitation Process>

Example 8

Apatite was produced by a coprecipitation process in the following manner. First, 21.25 g of calcium nitrate and 0.40 g of chromium nitrate were dissolved in decarbonated pure water. While stirring the solution with a magnetic stirrer, 5.55 cm³ of 30% aqueous solution of titanium sulfate and 2.94 cm³ of 95% aqueous solution of phosphoric acid were dripped. Finally, 10% aqueous ammonia was added quickly to adjust the pH to 9. Later, it was aged at 100° C. for 5 hours, filtered and washed in 4 dm³ of pure water, dried in a 100° C. oven so as to obtain a Cr-doped TiHAP powder. This TiHAP powder was heated to 650° C. in one hour to be fired, and thus a sample for Example 8 was obtained.

The molar ratio (mol %) of Ca to Ti and Cr in the apatite material solution was Ca:Ti:Cr=90:9:1.

Example 9

A sample for Example 9 was produced in the same manner as in Example 8 except that the molar ratio (mol %) of Ca to Ti and Cr in the apatite material solution was Ca:Ti:Cr=90:7:3.

Example 10

A sample for Example 10 was produced in the same manner as in Example 8 except that the powder was heated to 300° C. in one hour to be fired.

Example 11

A sample for Example 11 was produced in the same manner as in Example 8 except that the powder was heated to 550° C. in one hour to be fired.

Example 12

A sample for Example 12 was produced in the same manner as in Example 8 except that the powder was heated to 600° C. in one hour to be fired.

Example 13

A sample for Example 13 was produced in the same manner as in Example 8 except that the powder was heated to 800° C. in one hour to be fired.

Example 14

A sample for Example 14 was produced in the same manner as in Example 8 except that an aqueous solution of titanium sulfate was not dripped.

The molar ratio (mol %) of Ca to Cr in the apatite material solution was Ca:Cr=99:1.

Comparative Example

For a sample in this Comparative Example, "TiHAP0201" in Example 1, which is supplied by Taihei Chemical Industrial Co., Ltd. was used directly.

<Forms of Respective Samples>

All of the samples in Examples 1-14 and Comparative Example were powders.

<Measurement of UV-Visible (UV-Vis) Reflection Spectra>

Figure 2:
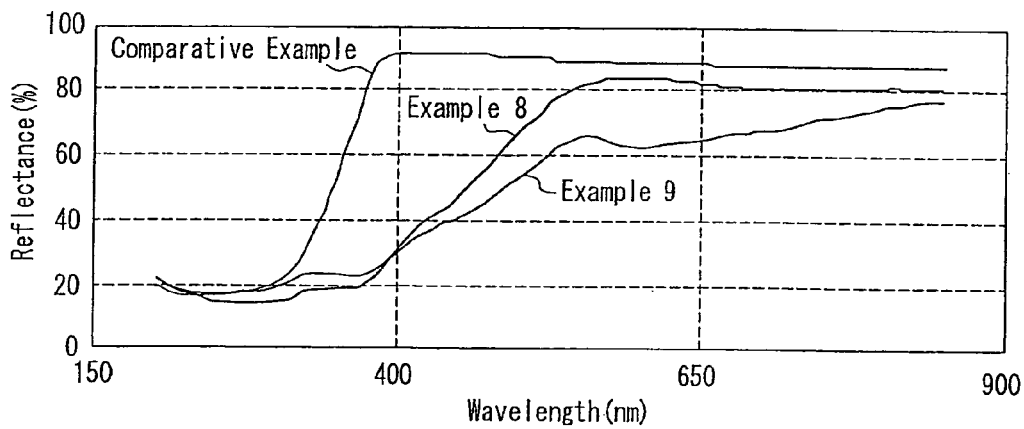
FIG. 2 is a graph showing UV-visible reflection spectra for Example 8, Example 9 and Comparative Example.

UV-Vis reflection spectra of the respective samples in Examples 1, 8, 9 and Comparative Example were measured. For the instrument, a UV/VIS Spectrophotometer "JASCO V-560" supplied by JASCO Corporation was used. The results are shown in FIGS. 1 and 2. FIGS. 1 and 2 illustrate that reflectance was lowered due to optical absorption not only for UV light (light having a wavelength of less than 380 nm) but also for visible light (light having a wavelength of 380 to 780 nm) in Examples 1, 8 and 9. In contrast, in Comparative Example, reflectance decrease caused by absorption of visible light did not occur, while the reflectance was decreased due to absorption of UV light alone.

<Evaluation (1) for Photocatalytic Function>

Photocatalytic functions of the respective samples in Examples 1, 8, 9 and Comparative Example were measured in the following manner.

First, the specific surface areas of the samples were measured by a BET method, and the samples were weighed on the basis of the values of the specific surface areas so that the surface areas would be 85.5 m². The samples were pressed to form tablet-shape test samples. Each of the test samples was introduced into a closed glass vessel of a capacity of 500 cm³ substituted by standard air, and an acetaldehyde gas ($CH_3CHO$) was introduced until the gas phase concentration became 7500 ppm. After being kept in dark for 1 hour, the product was irradiated with visible light for 3 hours and then irradiated with UV light for 2 hours. During the irradiation, the concentration of the acetaldehyde gas in the closed glass vessel and the concentration of carbon dioxide gas ($CO_2$) generated due to decomposition of the acetaldehyde gas were measured every hour.

For the instrument, a gas chromatograph "GC-390B" supplied by GL Sciences was used. A light beam (39500 lx) used for irradiation of visible light was obtained by removing UV light through a combination of a xenon light source "LA-251Xe" supplied by Hayashi Watch-Works Co., Ltd. and an L-42 filter. A black light (1 mW/cm²) was used for irradiation of UV light.

Figure 3:
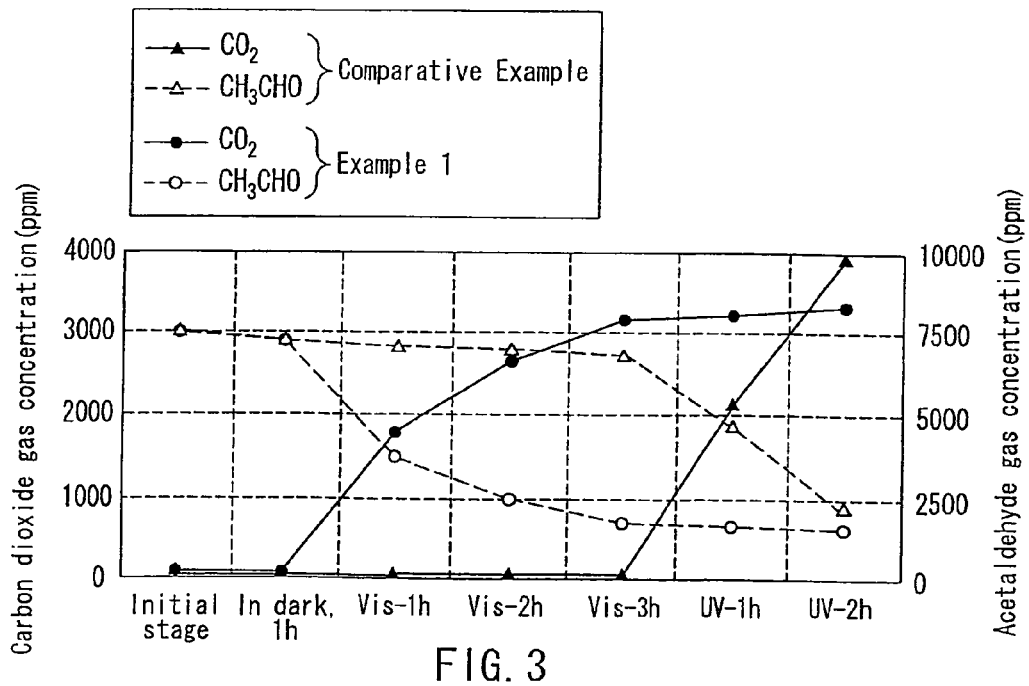
FIG. 3 is a graph showing changes in carbon dioxide gas concentrations and acetaldehyde gas concentrations for Example 1 and Comparative Example.
Figure 4:
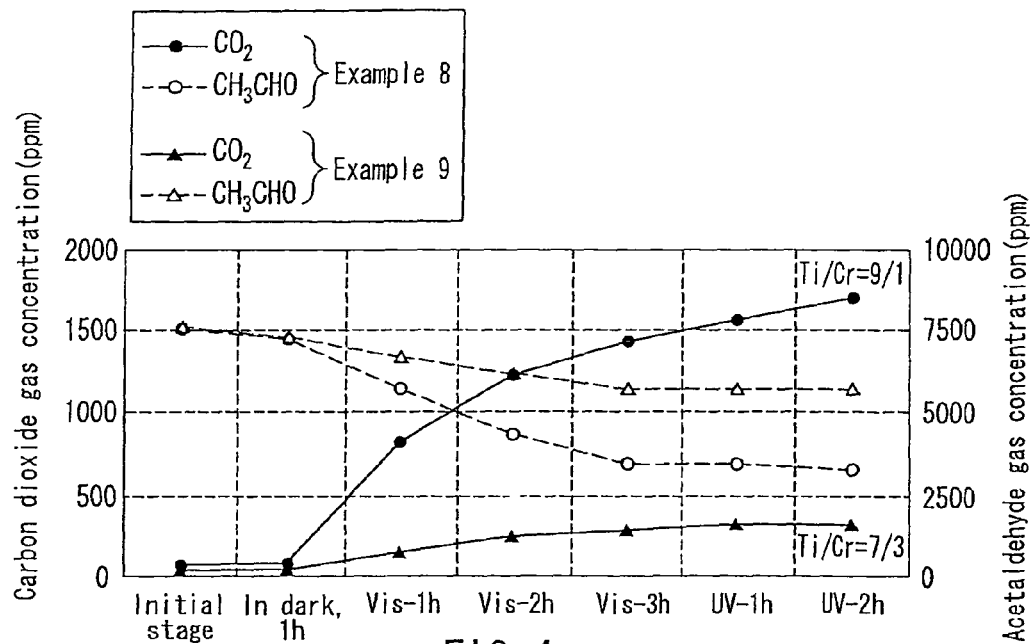
FIG. 4 is a graph showing changes in carbon dioxide gas concentrations and acetaldehyde gas concentrations for Example 8 and Example 9.

The results are shown in FIGS. 3 and 4. In FIGS. 3 and 4, "In dark, 1 h" indicates that the product was kept in dark for 1 hour. "Vis-1 h" indicates that visible light was irradiated for 1 hour, and "UV-1 h" indicates that UV light was irradiated for 1 hour. The same will be applied in the following figures.

FIGS. 3 and 4 illustrate that the acetaldehyde gas concentrations were decreased and the carbon dioxide gas concentrations were raised due to irradiation of visible light in Examples 1, 8 and 9. This tendency was maintained also by irradiation of UV light. Thereby, it was confirmed that the samples in Examples 1, 8 and 9 have not only a UV photocatalytic function but visible photocatalytic function.

In contrast, in Comparative Example, there were neither decrease in the acetaldehyde gas concentration or increase in the carbon dioxide gas concentration substantially in a case of irradiation of visible light. However, similarly in Comparative Example, the acetaldehyde gas concentration was decreased and the carbon dioxide gas concentration was increased by irradiation of UV light.

<Optimization of Content of Metal Atoms that Absorb Visible Light in an Apatite Material Solution in a Coprecipitation Process>

FIG. 4 indicates that the chromium content in the apatite material solution in a coprecipitation process is not less than 0.5 mol % and not more than 2 mol % preferably with respect to the total of the titanium and chromium, and more preferably, not less than 0.5 mol % and not more than 1.5 mol %.

<Optimization of Concentration of Metal Atoms that Absorb Visible Light in a Dipping Solution in a Dipping Process>

Figure 5:
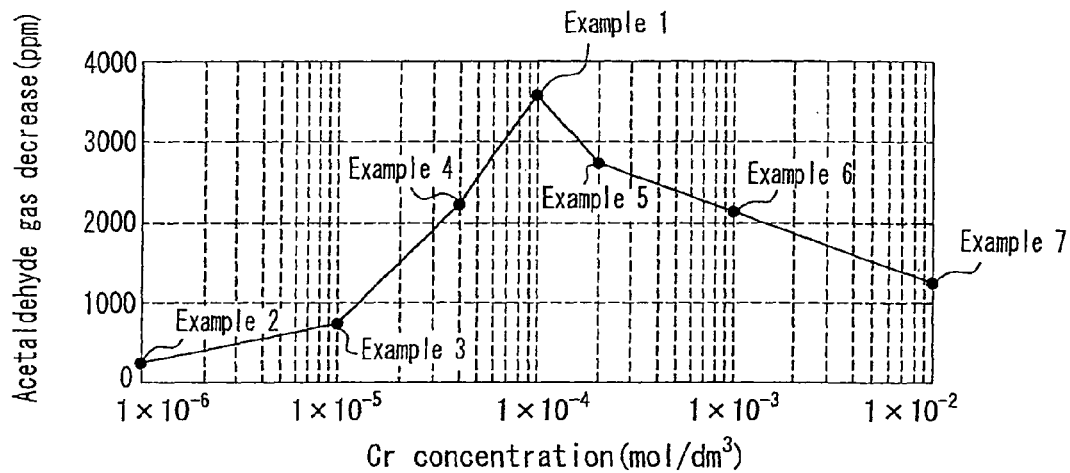
FIG. 5 is a graph showing relationships between chromium concentrations in aqueous solutions of chromium nitrate and decreases of acetaldehyde gases.

Photocatalytic functions for the samples in Examples 2-7 were measured in the same manner as mentioned above. The results are shown together with the result of Example 1 (Cr concentration: $1\times10^{-4}$ mol/dm$^3$) in FIG. 5. FIG. 5 shows a decrease in the acetaldehyde gas concentration every hour of irradiation of visible light plotted for every concentration of the aqueous solution of chromium sulfate. FIG. 5 indicates that the concentration of the aqueous solution of chromium sulfate (dipping solution) is preferably not less than $1\times10^{-5}$ mol/dm$^3$ and not more than $1\times10^{-3}$ mol/dm$^3$, and more preferably, not less than $4\times10^{-5}$ mol/dm$^3$ and not more than $2\times10^{-3}$ mol/dm$^3$.

<Optimization of Firing Temperature>

Figure 6:
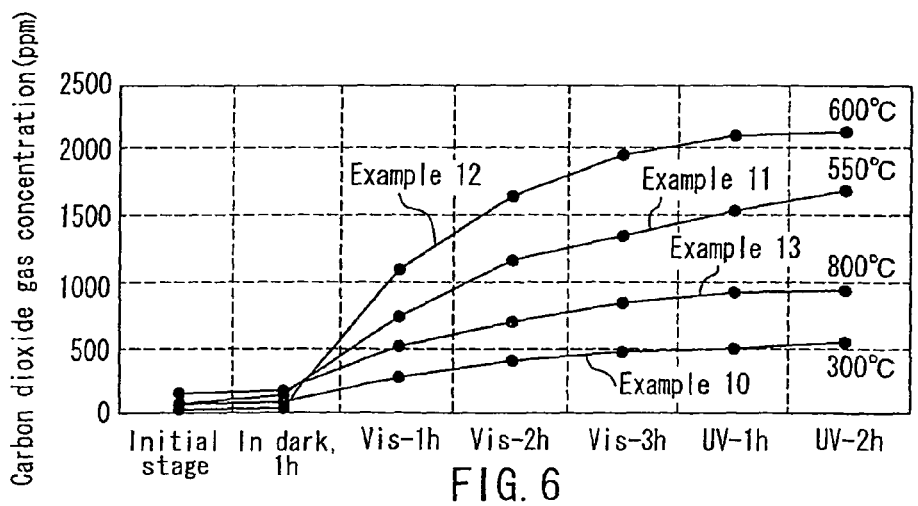
FIG. 6 is a graph showing a relationship between a firing temperature and a carbon dioxide gas concentration.

The photocatalytic functions of the samples in Examples 10-13 were measured in the same manner as mentioned above. The results are shown in FIG. 6. FIG. 6 shows a carbon dioxide gas concentrations measured at every time during irradiation with visible light and UV light. The results in FIG. 6 and the result in the above Example 8 (firing temperature: 650° C.) indicate that preferably the firing temperature is not lower than 500° C. and not higher than 700° C., and more preferably, not lower than 550° C. and not higher than 650° C.

<Evaluation (2) of Photocatalytic Function>

Figure 7:
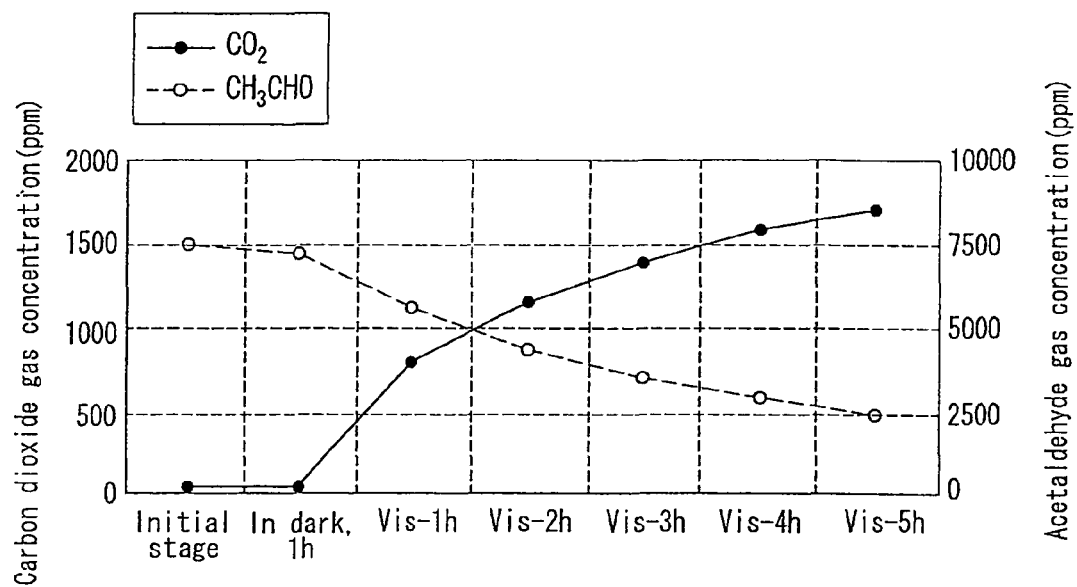
FIG. 7 is a graph showing a change in a carbon dioxide gas concentration and an acetaldehyde gas concentration for Example 14.

The photocatalytic function of the sample in Example 14 was measured in the same manner as mentioned above. The results are shown in FIG. 7. In FIG. 7, visible light alone was irradiated for 5 hours. Though the sample in Example 14 does not contain titanium for absorbing UV light, it exhibited a visible photocatalytic function substantially same as that in Example 1, since the sample in Example 14 contains chromium that absorbs visible light. Thereby, it is shown that chromium substantially alone serves to exhibit a visible catalytic function.

INDUSTRIAL APPLICABILITY

The present invention provides apatite having novel constitution and a method for producing the same, and an apatite base material. A photocatalytic function can be exhibited even indoors by using the apatite base material for various products to be arranged indoors.

What is claimed is:

1. A method for producing apatite, comprising:
   preparing an apatite material solution containing metal atoms that absorb visible light and other metal atoms and not containing undoped apatite where the content of the metal atoms that absorb visible light is not less than 0.5 mol % and not more than 3 mol % with respect to the whole metal atoms contained in the solution;
   coprecipitating components contained in the apatite material solution so as to form doped apatite;
   drying the formed doped apatite; and
   subsequently firing the formed doped apatite at a temperature of not lower than 500° C. and not higher than 700° C., wherein:
   the metal atoms that absorb visible light are atoms of at least one kind of metal selected from the group consisting of Cr, Co, Cu, Fe and Ni, and
   the other metal atoms further contain metal atoms of at least one kind of metal selected from the group consisting of Ti, Zr and W as metal atoms that absorb UV light.

2. The method for producing apatite according to claim 1, wherein the other metal atoms are atoms of at least one kind of metal selected from the group consisting of Ca, Al, La, Mg, Sr, Ba, Pb, Cd, Eu, Y, Ce, Na and K.

* * * * *